United States Patent
Wang et al.

(10) Patent No.: US 8,642,122 B2
(45) Date of Patent: *Feb. 4, 2014

(54) FORMATION OF THIN UNIFORM COATINGS ON BLADE EDGES USING ISOSTATIC PRESS

(75) Inventors: Xiandong Wang, Acton, MA (US); Neville Sonnenberg, Newton, MA (US)

(73) Assignee: The Gillette Company, Boston, MA (US)

( * ) Notice: Subject to any disclaimer, the term of this patent is extended or adjusted under 35 U.S.C. 154(b) by 1000 days.

This patent is subject to a terminal disclaimer.

(21) Appl. No.: 12/352,392

(22) Filed: Jan. 12, 2009

(65) Prior Publication Data
US 2010/0178515 A1     Jul. 15, 2010

(51) Int. Cl.
*B05D 1/00* (2006.01)
(52) U.S. Cl.
USPC ...... 427/209; 427/388.1; 428/421; 30/346.53
(58) Field of Classification Search
USPC .................. 264/419, 313, 314, 316, 271.1; 76/104.1–106.5; 30/346–357; 427/209, 427/435, 427.5, 388.1; 428/421
See application file for complete search history.

(56) References Cited

U.S. PATENT DOCUMENTS

| | | | | |
|---|---|---|---|---|
| 3,459,213 | A * | 8/1969 | Schenck, Jr. et al. | 137/340 |
| 3,537,700 | A * | 11/1970 | Schenck, Jr. et al. | 264/112 |
| 4,368,217 | A * | 1/1983 | Tournut | 427/181 |
| 5,096,518 | A * | 3/1992 | Fujikawa et al. | 156/89.28 |
| 5,477,756 | A * | 12/1995 | Trankiem et al. | 76/104.1 |
| 5,985,459 | A * | 11/1999 | Kwiecien et al. | 428/421 |
| 6,311,364 | B1 * | 11/2001 | Reo | 15/250.48 |
| 7,043,819 | B1 * | 5/2006 | Arnold | 29/527.2 |
| 2005/0268470 | A1 * | 12/2005 | Skrobis et al. | 30/346.54 |
| 2009/0072428 | A1 * | 3/2009 | Lizotte et al. | 264/101 |

FOREIGN PATENT DOCUMENTS

DE      20312001 U1     10/2003

OTHER PUBLICATIONS

Isostatic Pressing. Description.[online]. Metal Powder Industries Federation, [retrieved on Oct. 14, 2011]. Retrieved from the Internet: <URL:http://www.mpif.org/designcenter/isostatic.asp?linkid=108>.*
Gul, R. M. and McGarry, F. J. (2004), Processing of ultra-high molecular weight polyethylene by hot isostatic pressing, and the effect of processing parameters on its microstructure. Polym Eng Sci, 44: 1848-1857. doi: 10.1002/pen.20186.*

* cited by examiner

*Primary Examiner* — Richard Crispino
*Assistant Examiner* — Yana Belyaev
(74) *Attorney, Agent, or Firm* — Joanne N. Pappas; Kevin C. Johnson; Steven W. Miller

(57) ABSTRACT

The invention discloses utilizing isostatic-press (IP) processes apply a polymeric material (e.g, a PTFE foil) to uncoated razor blade edges forming thin, dense, and uniform coatings on blade edges which in turn exhibit low initial cutting forces correlating with more comfortable shaves. The isostatic press may be a hot isostatic press (HIP) or a cold isostatic press (CIP) or any other isostatic press process. The HIP conditions may include an environment of elevated temperatures and pressures in an inert atmosphere. The CIP conditions may include room temperature and elevated pressure. The polymeric material may be a fluoropolymer or non-fluoropolymeric material or any composite thereof. The lower surface of the polymeric material may be modified (e.g., chemical etching) to enhance adhesion to the blade edge. Two or more layers of polymeric material of similar or different properties may be isostatically pressed onto the uncoated blades.

13 Claims, 6 Drawing Sheets

FORMATION OF THIN UNIFORM COATINGS ON BLADE EDGES USING ISOSTATIC PRESS

FIELD OF THE INVENTION

This invention relates to razor blades, and more particularly to coatings on razor blade cutting edges and manufacture thereof.

BACKGROUND OF THE INVENTION

It is generally known in the prior art that a wet razor assembled with fluoropolymer coated blades outperforms a razor assembled without fluoropolymer-coated blades. One of the most common fluoropolymers utilized for coating razor blades is polytetrafluoroethylene or PTFE (or a form of Teflon®). The addition of PTFE (e.g., telomer) coating to the blade cutting edge dramatically reduces the cutting forces for beard hairs or other types of hair fibers. A reduced cutting force is desirable as it significantly improves shaving attributes including safety, closeness and comfort. Such known PTFE-coated blade edges are described in U.S. Pat. No. 3,071,856.

There are many types of coating processes that could be utilized to produce polymer coated (e.g., PTFE) coated blade edges. Some processes involve aqueous dispersion of the PTFE and some involve organic dispersion of the PTFE. Aqueous dispersion processes may include spraying, spin coating and dipping. PTFE may also be deposited on blade edges using vacuum based processes such as sputtering or thermal Chemical Vapor Deposition (CVD). However, when quality, cost and environmental issues are considered, the spraying of an aqueous PTFE dispersion is typically desired. PTFE dispersion in an organic solvent is also a known process in the art. This type of dispersion may include for example, Dupont's Vydax 100 in isopropanol as described in U.S. Pat. No. 5,477,756.

Regardless of whether an aqueous or organic based dispersion is utilized, if a spraying 30 process is utilized along with a subsequent sintering process, a non-uniform surface morphology, on a microscopic scale, is produced on blade edges and in the area proximal to the ultimate blade tips as shown in FIG. 1. This may be caused by the particle size dispersion of PTFE particles and by the wetting and spreading dynamics of dispersion. Typically, the average thickness of PTFE coating produced by a spraying process is about 0.2 μm to about 0.5 μm.

It should be noted that the thinner the PTFE coating becomes on blade edges, the lower the cutting force (assuming the coating is uniform). While this is generally desirable as mentioned above, too thin PTFE coatings on blade edges can give rise to poor coverage and low wear resistance due to intrinsic properties of the PTFE material. Alternatively, a too thick PTFE coating may produce very high initial cutting forces, which generally may lead to more drag, pull, and tug, eventually losing cutting efficiency and subsequently shaving comfort. Thus, there is a technical challenge to balance the attributes of the polymeric material with obtaining the thinnest coating possible to provide improved shaving attributes.

This fuels the desire in the art to form a thin, dense and uniform coating with extremely low coefficient of friction onto the blade edge.

Previous efforts made towards this objective, such as selection of different PTFE dispersions, modification of the surfactant used in the dispersion and/or optimization of spray-sintering conditions have had moderate effectiveness.

Some known solutions for thinning the PTFE on the blade edges include (1) mechanical abrasion, polishing, wearing, or pushing back; (2) a high energy beam (electron, gamma ray or X-ray, synchrotron) or plasma etching; and (3) application of Flutec® technology or Perfluoper-hydrophenanthrene (PP11) oligomers.

The disadvantage of the first mechanical abrasion solution is that it is difficult to control, may produce non-uniform thinning and may also cause edge damage. The disadvantage of applying high energy beams to thin the PTFE is that it may change the cross linking and molecular weight of PTFE thereby increasing friction and hence, cutting force.

One relatively successful approach has been the application of Flutec® technology as described in U.S. Pat. No. 5,985,459 which is capable of reducing the thickness (e.g., or thinning) a relatively thick PTFE coating produced by a spray and sintering process. This prior art process, as shown in FIG. 1 depicts a flow 10 where blade 12 which has sprayed PTFE particles 11 coated on and around its tip 13 is sintered as shown at step 14 with Argon at about 1 atmospheric pressure (1 atm) and at a temperature of about 330 degrees Celsius (° C.) to about 370° C. to produce a sintered PTFE coating 16. Typically, the average thickness of PTFE coating produced by a spraying process is about 0.2 μm to about 0.5 μm.

The Flutec® technology as shown at step 17 is subsequently placed on coating 16 to produce a thinned PTFE coating 18. This typically includes soaking the PTFE coated blades 16 in solvents under elevated temperatures of about 270 degrees Celsius to about 370 degrees Celsius and at a pressure of about 3 atm to about 6 atm. In general, the solvents employed in the Flutec® process include solvents such as perfluoroalkanes, perfluorocycloalkanes, or perfluoropolyethers.

With the Flutec® approach, a more uniform PTFE coating 18 with about 10 nm to about 20 nm in thickness may be achieved consequently resulting in a reduction of the first cutting force of blade edges on wool-felt-fibers of nearly 40% compared to many approaches utilized prior to the knowledge of the Flutec® treatment. However, a major drawback to the Flutec® process is that even though most of the solvents used are capable of being recycled, some needs to be disposed of as waste.

Another disadvantage of the Flutec® technology is that the chemical solvent used in the Flutec® process typically removes most of the PTFE materials from the sintered coating 18 which, as mentioned above, provide the improved shaving attributes.

Another disadvantage of the Flutec® technology is that generally the resultant Flutec® coatings still exhibit porosity since coating molecules are not densely packed. Because of this, a coating with a desirably high molecular weight is difficult to achieve.

Thus, there is a need for an alternative apparatus and method to produce thin, uniform and dense coatings on blade edges.

SUMMARY OF THE INVENTION

The invention provides a method for forming a razor blade edge by applying at least one polymeric material having an upper surface and a lower surface to at least one blade edge by isostatic press (IP) to form an isostatically-pressed coating on the at least one blade edge. The lower surface of the polymeric material adheres to the blade edge. The polymeric material includes a fluoropolymer, such as PTFE. The polymeric material has an average molecular weight in the range of about 10,000 Dalton to about 1,000,000 Dalton.

The isostatic press of the present invention includes a hot isostatic press (HIP) or a cold isostatic press (CIP). The isostatically-pressed coating ranges in thickness from about 10 nm to about 100 nm, has a substantially uniform thickness, and has a substantially uniform surface morphology in addition to substantially zero porosity. The HIP conditions include a temperature in the range of about 300° C. to about 380° C., an inert atmosphere of argon or nitrogen, a pressure range of about 10 MPa to about 550 MPa. These conditions are applied for a time ranging from about 10 minutes to about 10 hours.

In one aspect of the invention, the lower surface of the polymeric material is modified by mechanical abrasion, chemical etching or film application to enhance adhesion to the blade edge.

In another embodiment of the present invention, the polymeric material includes a non-fluoropolymeric material.

The razor blade substrate of the present invention may be comprised of steel with or without top layer coatings such as Chromium (Cr), Diamond-like Carbon (DLC), Amorphous Diamond, or Chromium/Platinum (Cr/Pt) or other suitable materials or combination of materials.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

BRIEF DESCRIPTION OF THE DRAWINGS

While the specification concludes with claims particularly pointing out and distinctly claiming the subject matter which is regarded as forming the present invention, it is believed that the invention will be better understood from the following description which is taken in conjunction with the accompanying drawings in which like designations are used to designate substantially identical elements, and in which:

DETAILED DESCRIPTION OF THE INVENTION

This invention relates to razor blade cutting edges which are formed such that they exhibit an improvement in shaving attributes in the first few shaves. One principal aspect of the invention is directed towards forming a thin, dense and uniform coating on the blade edge which has a low cutting force and low friction. The term "thin" refers to the thickness of the coating of the present invention. Generally, the thinner the coating becomes on blade edges, the lower the cutting force and the better the shaving attributes. The term "dense" as used herein signifies the lack or substantial elimination of porosity exhibited in the coating of the present invention. Denseness is desirable as it provides for lower friction and cutting forces, more consistent shaves, in addition lower wear rates (e.g., longer blade life). The term "uniform" as used herein refers to the surface morphology (e.g., smoothness) exhibited in the coating of the present invention. Similarly, the more uniform the surface of the coating is the more comfortable the shave will be and the lower the wear rate, among other things. As mentioned above, a commonly utilized material for blade edge coating is a type of fluoropolymer, namely PTFE. As such, PTFE will be referenced throughout the description of the instant invention but not to the exclusion of other materials (mentioned below) which may be substituted substantially equivalently.

Razor blade edges produced according to the present invention, as will be described below, exhibit lower initial cutting forces which correlate with more comfortable first few shaves, than those produced by conventional spraying and sintering technologies.

The invention discloses a novel application of a known process or technology called isostatic pressing which may include hot isostatic pressing (HIP), cold isostatic pressing (CIP), other related CIP processes or other isostatic processes. Generally, isostatic presses are known to be used for compressing materials such as ceramics, metal alloys and other inorganic materials. Some examples of the uses of HIP process include ceramic turbine blades, nickel based superalloy turbines, aluminum casting and materials that need low porosity. While isostatic pressing processes represent a relatively mature technology, they have generally not been utilized in the polymer industry.

Figure 2:
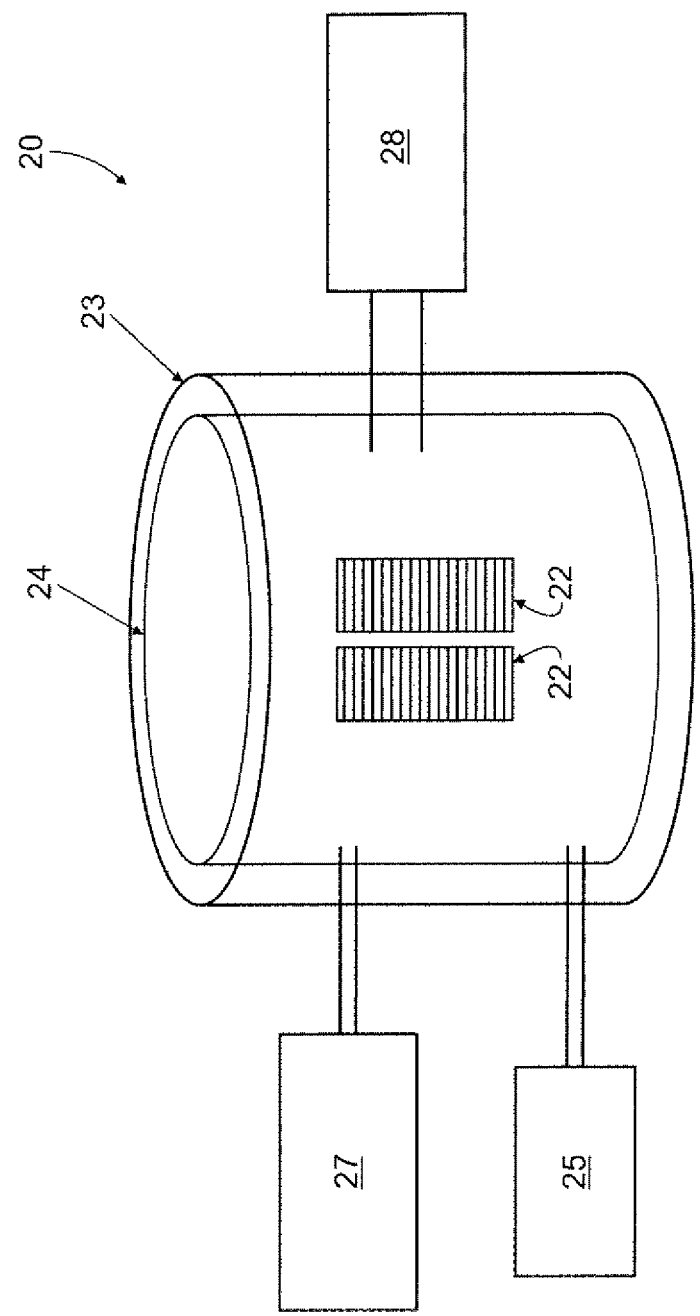
FIG. 2 is a schematic of an isostatic press in accordance with the present invention.

As shown in FIG. 2, the HIP process apparatus 20 typically subjects components to both elevated temperature in a heating chamber 23 and elevated isostatic gas pressure in a high pressure containment vessel 24. In the instant invention, the components placed in the apparatus 20 are razor blades, inserted for instance in the form of blade spindles 22. A vacuum 25 pumps air into the vessel 24. A pressurizing gas most commonly used in a HIP process via compressor 27 is Argon (Ar) which is an inert gas. Other gasses may be used such as nitrogen. Such an inert gas is used to reduce damage to the blades and the polymeric material. The HIP chamber 20 is heated, causing the pressure inside the pressure vessel 24 to increase and the gas, pressure and temperature are managed by a control unit 28. Generally, isostatic processes such as HIP may be applied for a time ranging from about 10 minutes to about 10 hours, desirably about 20 to 30 minutes.

In all types of isostatic processes, pressure is applied to the component from all directions; hence the term "isostatic."

Though not shown in FIG. 2, the CIP process is fairly similar to the HIP process except that it functions at room temperature and may involve a liquid medium (often an oil-water mixture) as a pressure mechanism, pumped in and pressurized on all sides to produce a uniform product and may in many instances require additional processing (e.g., such as sintering) to provide an adequate finished product. Generally, CIP involves applying high isostatic pressure over about 98 MPa (1000 kgf/cm$^2$) to about 550 MPa. CIP is a very effective powder-compacting process. Two well-known CIP methods include the wet-bag process in which the powder substance enclosed in a rubber bag is directly submerged into the high-pressure medium, and the dry-bag process in which the pressing work is accomplished through rubber molds built into the pressure vessel.

For purposes of the present invention, it is contemplated that any of the known isostatic pressing processes may be used substantially interchangeably to generate the desired product results with plausibly some modifications either in temperature, pressure or added processing. Hence, while a hot isostatic pressing embodiment of the present invention is described in more detail below, the notion to use any of the other types of isostatic pressing (either in addition to or in its place) is contemplated in the present invention.

The HIP process applied to blade edges provides a new application for HIP conditions that may effectively manipulate the thickness profile of a coating such as a polymer coating as described below. In a desirable embodiment of the present invention of FIG. 3, a hot-isostatic-press is used on uncoated blade edges to produce thin, dense, and uniformly coated blade edges.

Figure 3:
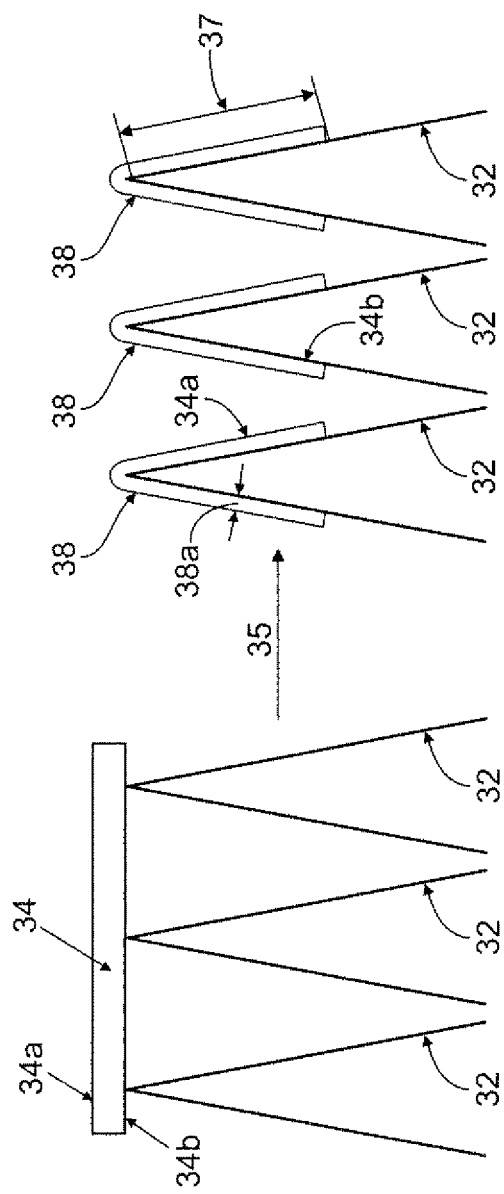
FIG. 3 is a schematic flow diagram having a uniform material in accordance with the present invention.

Referring now to FIG. 3, blades 32 which desirably do not include any previously-applied coating (e.g., fluoropolymer particles such as PTFE sprayed on) are, at step 35, subjected to HIP conditions as described in conjunction with FIG. 2 to place a polymeric material 34 (e.g., a film, sheet, tape, foil, such as a thin PTFE foil, or any other form) onto blades 32 in accordance with one embodiment of the present invention. This embodiment forms a thin, uniform, dense isostatically-pressed PTFE coating 38 on blades 32 while also producing a PTFE coating with high molecular weight in contrast to the prior art. A higher molecular weight is desirable, as it provides even lower cutting force and lower friction in coatings with the same thickness etc. formed via prior art processes. Additionally, the high molecular weight of resultant isostatically-pressed coating 38 allows for more durability with a lower wear rate over coatings formed via prior art processes. The average molecular weight may be in the range of about 30000 to about 60000 Dalton and desirably about 45000 Dalton.

Material 34 has an upper surface 34a and a lower surface (or underside) 34b. Lower surface 34b is the surface that will be placed to adhere on the blades 32 and blade tips with the HIP conditions at step 35. Upper surface 34a is the surface that will be in contact with the skin or area to be shaved.

Figure 3A:
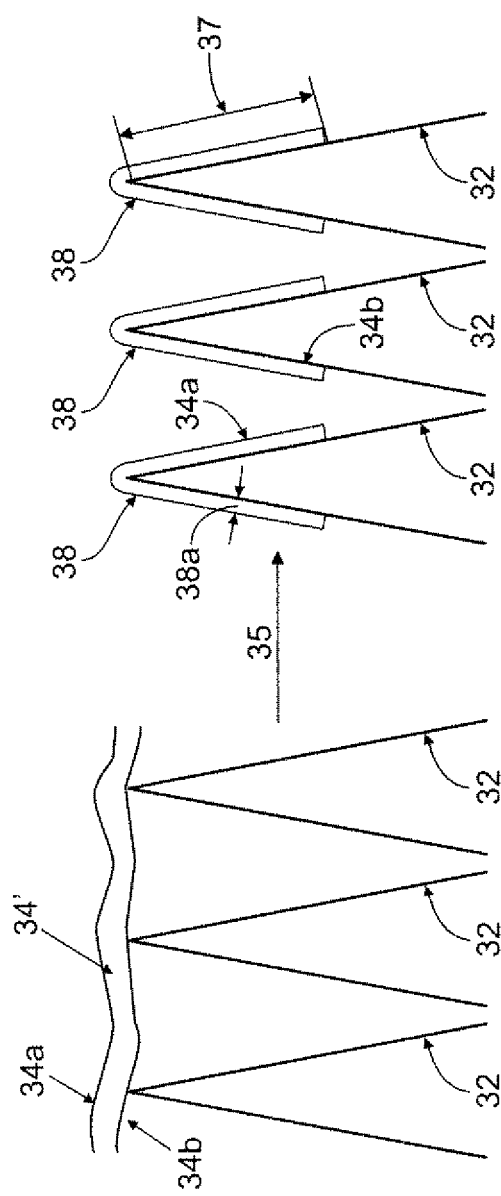
FIG. 3a is a schematic flow diagram having a non-uniform initial material in accordance with the present invention.

In the present invention, material 34 may be of uniform or non-uniform thickness, the latter shown at 34' in FIG. 3a. Material 34 may also be formed in two or more discrete sheets. For instance, an individual sheet may be applied to an individual blade edge and tip (not shown). Regardless of the initial character of material 34, the HIP conditions at 35 provide for a thin, dense and uniform resultant coating 38. Modifications to material 34 and in particular modifications to lower surface 34b of material 34 to enhance adhesion will be described in conjunction with FIG. 4.

The HIP conditions at step 35 in the present invention may include a temperature in the range of about 300° C. to about 380° C. or a temperature near the PTFE melting temperature which is about 327° C. A desirable temperature in the present invention may be from about 330° C. to about 370° C. In addition, in the present invention the HIP conditions at step 35 may include a pressure range of about 100 MPa to about 550 MPa. Usually HIP is run at about 100 MPa to about 350 MPa and desirably at about 220 MPa. As mentioned above, the HIP conditions at step 35 in the present invention may necessarily include an inert atmosphere, desirably in argon or nitrogen.

By having an elevated temperature, the HIP conditions allow the PTFE foil material to soften, deform, and "creep" or flow over the blade edge surface. Creeping will gradually and permanently deform the PTFE coating upon continued application of heat or stress (e.g., pressure). As the PTFE material flows, it forms a thin, uniform, and dense coating layer over both bevel areas of the surface of the blade edge. As mentioned above, it has been known that both PTFE coating thickness and its morphology on the blade edge are very critical and important in terms of lowering the cutting force and obtaining a better shaving experience.

The thickness of resulting PTFE coating 38 of FIG. 3 is in the range of about 10 nm to about 100 nm and desirably about 20 nm. The thickness 38a of coating 38 is substantially uniform throughout all areas of the coating with the potential for some slightly non-significant or slightly thicker areas (e.g., at the blade tip). The surface morphology of coating 38 is smooth having virtually no agglomerations of PTFE particles (e.g., areas of non-uniformity in thickness or protruding PTFE particles) thereby providing optimal friction and cutting force. Additionally, the pressed coating 38 has substantially zero porosity (e.g., minimal apertures) and as such is relatively dense. After HIP conditions are applied to the foil 34, it should be noted that the surface area or length 37 of coating 38 formed is generally greater than 150 μm. This is desirable as this is the approximate surface area of the razor blade that would touch a user's skin. Because HIP conditions are generally provided with the capacity for good quality control, the desired coating dimension of 150 μm is generally easily attainable.

In particular, one advantageous characteristic of the thickness of the PTFE coating around the ultimate tips of the blade edges being substantially dense, thin, and uniform, is the significant lowering of the cutting force of the blades (e.g., wool-felt fiber or hair fiber cutting force is significantly reduced). For example, the $1^{st}$ wool-felt-cut force (or cutting force) may have a percentage force reduction after HIP processing from about 15% to about 65% or the $1^{st}$ wool-felt-cut force (or cutting force) be reduced in the range of about 1.10 lbs to about 1.70 lbs after HIP processing.

This consequence of the HIP process (e.g., lowering of the first cutting force of the blade edge substantially compared with traditional sintering processes) provides blade edges with lower first cutting force leading to more comfortable and closer shaves. It has been shown that improved shaving attributes such as closeness and comfort have been achieved with HIP-treated PTFE coated blades for a wet shaving system.

This apparatus and process for coating substantially a "naked" blade with a polymer foil or sheet of material has many other advantages as well.

One apparent advantage is that because there is no need for the blades to be initially coated with a polymer by another apparatus and process, the step of spraying and/or sintering of coatings is eliminated thereby reducing the cost and effort for coating blade edges.

Figure 1:
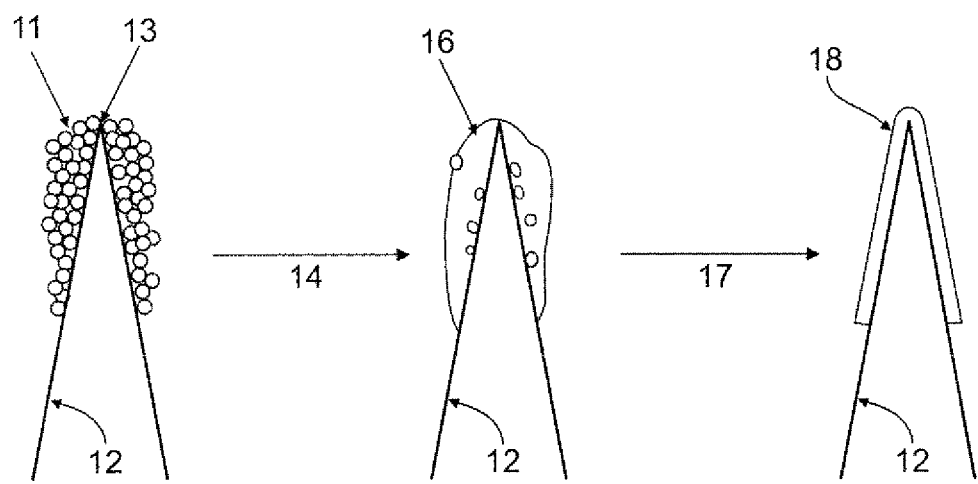
FIG. 1 is a flow diagram depicting a prior art process using Flutec® technology.

Furthermore, since the novel isostatic press technology applied to blade edges provides a non-chemical technique for coating the PTFE foil on blade edges (e.g., no use of any organic solvents, thereby providing an environmentally benign and simple solution), it is also advantageous over known chemical processes (e.g., Flutec® technology) since there is no loss of original polymeric material. It follows that, under optimized conditions, this novel technique as described herein may be an alternative approach to known coating or thinning processes, (e.g., of FIG. 1 depicting spray sintering and Flutec® technology) and as such, in light of cost-effectiveness as well, may be used in lieu of these processes entirely.

Figure 4:
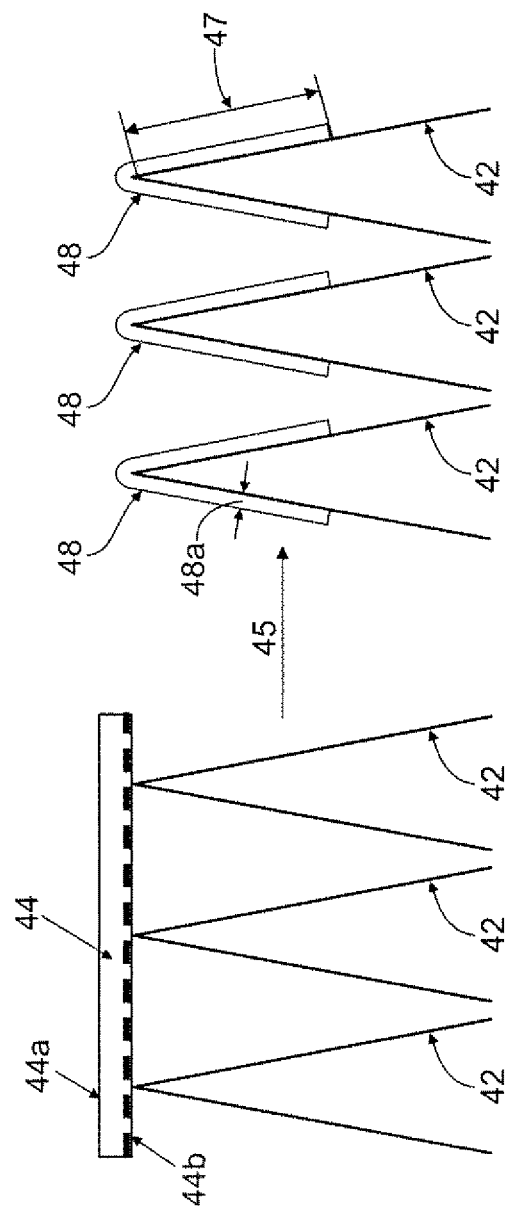
FIG. 4 is a schematic flow diagram having a modified material in accordance with the present invention.

Referring now to FIG. 4, the PTFE foil material 44 (similar to material 34 of FIG. 3) is shown modified on its lower surface 44b in accordance with the present invention. This surface modification may be achieved by mechanical, chemical or other means. Mechanically, surface abrasion may be produced. Some examples of chemical modification contemplated in the instant invention include, but are not limited to, chemical etching or applying a layer of sodium in naphthalene solvent (e.g., moth balls) onto the lower surface 44b prior to HIP conditions being applied at 45 such that, with elevated temperatures and pressures provided by HIP conditions, adhesion is improved. Other modifications may include the application of an adhesive or the application of a hydrophilic thin film material to the lower surface 44b.

The surface modifications of the present invention should assist in the retention of the material 44 on the blades 42 or provide enhanced adhesion of the polymer foil material 44 onto the top surface of the at least one blade edge (e.g., bevel areas 47).

Any surface modification is desirably accomplished prior to the isostatic press (e.g., HIP) conditions at 45 being applied as indicated in FIG. 4. Isostatically-pressed coatings 48 of thin, dense and uniform characteristics are achieved as described above in conjunction with FIG. 3. Thickness 48a, for instance, is in the range of about 10 nm to about 100 nm and desirably about 20 nm as described above in FIG. 3. The thickness 48a of coating 48 is also substantially uniform throughout all areas of the coating with the potential for some non-significant but slightly thicker areas (e.g., at the blade tip). The surface morphology of coating 48 is smooth having virtually no agglomerations of PTFE particles (e.g., areas of non-uniformity in thickness or protruding PTFE particles) thereby providing optimal friction and cutting force. Additionally, the isostatically-pressed coating 48 has substantially zero porosity (e.g., minimal apertures) and as such is relatively dense. After HIP conditions are applied to the material 44, the surface length 47 of pressed coating 48 formed is desirably generally about or greater than 150 μm.

Figure 5:
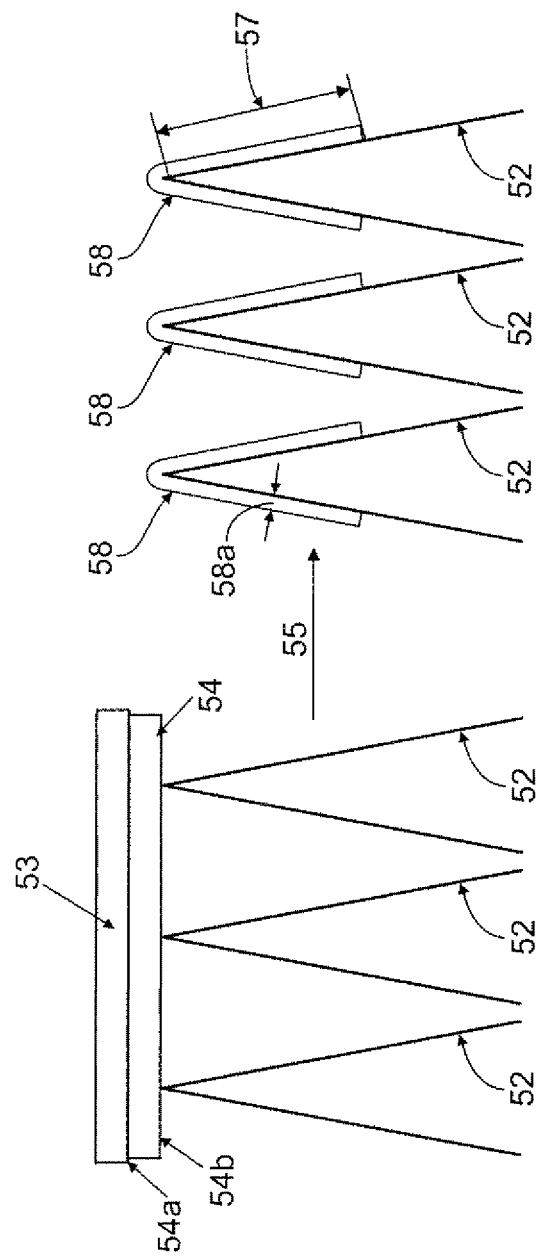
FIG. 5 is a flow diagram of FIG. 3 having more than one material in accordance with the present invention.

Referring now to FIG. 5, the material 54 of FIG. 3 is shown with an additional material 53 placed on its upper surface 54a in accordance with the present invention. The materials 53 and 54 are desirably polymeric materials, such as a fluoropolymeric material (e.g., PTFE foil). They may comprise, as described above, a sheet, foil, tape, or a film or any other form. Two or more such materials may be layered onto each other prior to HIP conditions being applied at step 55 to provide improved isostatically-pressed coatings 58 after HIP conditions have been applied. Isostatically-pressed coatings 58 will have thin, dense and uniform characteristics as described above in conjunction with FIGS. 3 and 4.

As discussed above with regard to FIG. 4, the lower surface 54b of the material 54 in FIG. 5 may also be modified (not shown) in accordance with the present invention. In addition, upper surface 54a may be modified to assist material 53's adhesion to material 54.

In the present invention, materials 53 and 54 may or may not be of the same type. They may have the similar or differing characteristics. For instance, it may be desirable for materials 53, 54 to be of different average molecular weights. Material 53, which comes into direct contact with the skin, may be of a higher molecular weight than material 54. A higher molecular weight is desirable as it generally provides for a lower cutting force and lower friction resulting in a better wear rate and consistency in shaving. A molecular weight on average in the range of about 10,000 Dalton to about 1,000,000 Dalton or desirably greater than about 100,000 Dalton would be suitable for such a material that comes into contact with the skin (e.g., material 53). Material 54 may have a lower molecular weight than material 53 and may average in the range of about 2,000 to about 10,000 Dalton and desirably 3,000 to 5,000 Dalton.

Additionally, in the present invention, one or the other of the materials of materials 53, 54 may be comprised of a polymeric material and the other material may be comprised of a polymer composite or even a non-polymeric material.

Accordingly, it is contemplated that any design choice or feasible permutation of materials and their respective characteristics may be utilized in the present invention.

The embodiments of the present invention indicate that the isostatic pressing technology may generally be more robust in terms of blade edge quality and provide potentially beneficial cost savings.

The IP (HIP or CIP)-produced improved morphological features on the coating will minimize cutting force variations of the blade edge and better protect the blade from being damaged. Further, the IP processes will improve overall product quality and help consumers to achieve a smooth and consistent shave experience.

The present invention contemplates that the isostatic processes such as the HIP or CIP, or other related isostatic processes may also be applicable to being used with other fluoropolymers in addition to PTFE, including but not limited to PFA (perfluoroalkoxy polymer resin), FEP (fluorinated ethylene-propylene), ETFE (polyethylenetetrafluoroethylene), PVF (polyvinylfluoride), PVDF (polyvinylidene fluoride), and ECTFE (polyethylenechlorotrifluoroethylene).

The present invention contemplates that the isostatic processes such as the HIP or CIP, or other related isostatic processes may also be applicable to being used with fluoropolymer (e.g., PTFE) composites, including, but not limited to PTFE/nanodiamond, PTFE/silica, PTFE/alumina, PTFE/silicone, PTFE/PEEK (polyetheretherketone), and PTFE/PFA.

Furthermore, the HIP process of the present invention is not necessarily constrained to being applied to PTFE or PTFE type materials and may also be applicable to other non-fluoropolymer (e.g., non-PTFE) coating materials, including, for instance, but not limited to, polyvinylpyrorridone (PVP), polyethylene, polypropylene, ultrahigh molecular weight polyethylene, polymethyl methacrylate, parylene and/or others.

Additionally, the blade substrate may be comprised of steel with or without top layer coatings such as Chromium (Cr), Diamond-like Carbon (DLC), Amorphous Diamond, Chromium/Platinum (Cr/Pt) or other suitable materials or combination of materials. It has been shown that the blade substrate being comprised of these materials (e.g., Cr or DLC) improves adhesion of the polymer coating material on the blade edge after HIP conditions have been applied.

In another embodiment of the present invention it is contemplated that the HIP conditions may be used in conjunction with a dry shaver in addition to a wet shaver where the cutter blades of the dry shaver are similarly subjected to HIP conditions as described above.

It is further contemplated in yet another embodiment of the present invention that the HIP conditions described above may be used in conjunction with blades that are implemented in medical or surgical instruments, such as surgical blades, scalpels, knives, forceps, scissors, shears, or the like or other non-surgical blades or cutting instruments.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for forming a razor blade edge comprising: initially applying, by isostatic press (IP), at least one polymeric material having an upper surface and a lower surface to at least one blade edge to form an isostatically-pressed coating on said at least one blade edge, wherein said isostatically-pressed coating ranges in thickness from about 10 nm to about 100 nm and wherein said razor blade is comprised of steel, Chromium (Cr), Diamond-like Carbon (DLC), Amorphous Diamond, or Chromium/Platinum (Cr/Pt).

2. The method of claim 1 wherein said isostatic pressing is comprised of a hot isostatic press (HIP) or a cold isostatic press (CIP).

3. The method of claim 2 wherein said HIP further comprises a temperature in the range of about 300° C. to about 380° C. and an inert atmosphere of argon or nitrogen.

4. The method of claim 2 wherein said HIP further comprises a pressure range of about 100 MPa to about 550 MPa.

5. The method of claim 2 wherein said HIP is applied for a time ranging from about 10 minutes to about 10 hours.

6. The method of claim 1 wherein said at least one blade edge is initially uncoated.

7. The method of claim 1 wherein said lower surface of said polymeric material is modified.

8. The method of claim 1 wherein said polymeric material comprises a fluoropolymeric material.

9. The method of claim 1 wherein said at least one polymeric material has an average molecular weight in the range of about 10,000 Dalton to about 1,000,000 Dalton.

10. The method of claim 1 wherein said isostatically-pressed coating is substantially uniform in thickness.

11. The method of claim 1 wherein said isostatically-pressed coating has a substantially uniform surface morphology.

12. The method of claim 1 wherein said isostatically-pressed coating has substantially zero porosity.

13. The method of claim 1 wherein said polymer comprises a non-fluoropolymeric material.

* * * * *